(12) United States Patent
Tsunoda et al.

(10) Patent No.: US 6,234,133 B1
(45) Date of Patent: May 22, 2001

(54) BALANCER SHAFT SUPPORT STRUCTURE IN ENGINE AND ENGINE HANGER DEVICE IN OUTBOARD ENGINE

(75) Inventors: Masaki Tsunoda; Shigekazu Sakata, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/297,088

(22) PCT Filed: Dec. 19, 1997

(86) PCT No.: PCT/JP97/04701

§ 371 Date: May 17, 1999

§ 102(e) Date: May 17, 1999

(87) PCT Pub. No.: WO98/27363

PCT Pub. Date: Jun. 25, 1998

(30) Foreign Application Priority Data

Dec. 19, 1996 (JP) .................................................. 8-340218
Dec. 19, 1996 (JP) .................................................. 8-340219

(51) Int. Cl.[7] .................................................. F02B 75/06
(52) U.S. Cl. .................................. 123/192.2; 123/196 W; 123/195 P
(58) Field of Search .......................... 123/192.2, 195 P, 123/196 W (56) References Cited

U.S. PATENT DOCUMENTS 5,537,968 * 7/1996 Takahashi ...................... 123/192.2

FOREIGN PATENT DOCUMENTS

| 63-192918 | 8/1988 | (JP) . |
| 2-221733 | 9/1990 | (JP) . |
| 3-76799 | 7/1991 | (JP) . |
| 4-166496 | 6/1992 | (JP) . |
| 4-337143 | 11/1992 | (JP) . |
| 4-353223 | 12/1992 | (JP) . |
| 8-68336 | 3/1996 | (JP) . |

* cited by examiner

Primary Examiner—Willis R. Wolfe
Assistant Examiner—Katrina B. Harris
(74) Attorney, Agent, or Firm—Arent Fox Kinter Plotkin & Kahn, PLLC (57) ABSTRACT

Integrally fastening a cylinder block 6 and a crankcase 7 together by dividing the cylinder block 6 and the crankcase 7 at a dividing surface 31 passing through the center of a crankshaft 15 vertically arranged and screwing a bolt 32 inserted from the crankcase 7 side in the cylinder block 6. The bolt 32 fastening the crankcase 7 to the cylinder block 6 is prevented from interfering with a pair of left and right secondary balancer shafts 37, 38 by supporting both the secondary balancer shafts by the cylinder block 6, but not by the crankcase 7 to increase the degree of freedom of the layout of both the secondary balancer shafts 37, 38.

6 Claims, 7 Drawing Sheets

BALANCER SHAFT SUPPORT STRUCTURE IN ENGINE AND ENGINE HANGER DEVICE IN OUTBOARD ENGINE

FIELD OF THE INVENTION

The present invention relates to a balancer shaft supporting structure in an engine which includes a crankshaft disposed substantially vertically and clamped between dividing surfaces of a cylinder block and a crankcase, and to an engine hanger device i n an outboard engine system provided with an engine which includes a pair of balancer shafts in a cylinder block.

BACKGROUND ART

So-called vertically-disposed engines each including a crankshaft disposed vertically are known from Japanese Patent Application Laid-open Nos. 63-192918 and 4-337143, in which a balancer shaft is supported on the side of a crankcase (on the side opposite from the cylinder block with the crankshaft interposed therebetween).

In the vertically-disposed engine described in the above Japanese Patent Application Laid-open No. 4-337143, the crankshaft is clamped between dividing surfaces of the cylinder block and the crankcase. However, such an engine suffers from a problem that if the balancer shaft is supported on the side of the crankcase, a bolt for coupling the crankcase to the cylinder block interferes with the balancer shaft and for this reason, a limitation is produced in the layout of the bolt and balancer shaft. Especially, when the balancer shaft is longer in the axial direction of the crankshaft, the above problem is significant, and it is difficult to dispose the balancer shaft without bringing about an increase in size of the crankcase.

An engine for an outboard engine system with a crankshaft disposed vertically is known from the above Japanese Patent Application Laid-open No. 4-337143, which includes a pair of secondary balancer shafts. In addition, an engine for an outboard engine system with a crankshaft disposed vertically is known from Japanese Utility Model Application Laid-open No. 3-76799, which includes an engine hanger on an upper surface of a cylinder block.

In the engine described in the above Japanese Patent Application Laid-open No. 4-337143, the pair of secondary balancer shafts are supported in the crankcase coupled to a front surface of the cylinder block. For this reason, if an attempt is made to ensure a space for disposition of the secondary balancer shafts, there is a possibility that the crankcase may protrude forwards (namely, toward a hull), thereby hindering the layout of auxiliaries around the crankcase. The art described in the above Japanese Utility Model Application Laid-open No. 3-76799 includes no balancer shaft and hence, the relationship between the engine hanger and a balancer shaft is not described.

DISCLOSURE OF THE INVENTION

The present invention has been accomplished with the above circumstances in view, and it is a first object of the present invention to ensure that a balancer shaft is disposed reasonably in a so-called vertically-disposed engine having a crankshaft disposed vertically.

It is a second object of the present invention to ensure that a pair of secondary balancer shafts and an engine hanger are disposed reasonably without bringing about an increase in size of an engine block.

To achieve the above first object, according to a first aspect and feature of the present invention, there is provided a balancer shaft supporting structure in an engine including a crankshaft disposed substantially vertically and clamped between dividing surfaces of a cylinder block and a crankcase, the crankcase being fastened to the cylinder block by bolts inserted from the side of the crankcase, characterized in that the structure includes balancer shafts connected to and driven by the crankshaft, the balancer shafts being supported substantially vertically in the cylinder block.

With the above arrangement, the balancer shaft connected to and driven by the crankshaft is supported substantially vertically in the cylinder block. Therefore, in fastening the crankcase to the cylinder block by bolts inserted from the side of the crankcase, there is not a possibility that the bolt may interfere with the balancer shaft, and hence, the degree of freedom in the layout of the balancer shaft is increased.

To achieve the first object, according to a second aspect and feature of the present invention, in addition to the first feature, there is provided a balancer shaft supporting structure in an engine characterized in that upper ends of the balancer shafts and an upper end of the crankshaft protrude upwards from an upper surface of the cylinder block, such protrusions of the balancer shafts and the crankshaft being connected together by a power transmitting means.

With the above arrangement, the upper ends of the balancer shafts and the upper end of the crankshaft protrude upwards from an upper surface of the cylinder block, and the protrusions of the balancer shaft and the crankshaft are connected together by a power transmitting means. Therefore, the power transmitting means can be disposed outside the cylinder block, whereby the maintenance of the power transmitting means can be facilitated.

To achieve the above first object, according to a third aspect and feature of the present invention, in addition to the second feature, there is provided a balancer shaft supporting structure in an engine characterized in that the power transmitting means is covered with a cover.

With the above arrangement, the power transmitting means can be protected from dusts or sea water by covering the power transmitting means with the cover.

To achieve the above first object, according to a fourth aspect and feature of the present invention, in addition to the third feature, there is provided a balancer shaft supporting structure in an engine characterized in that the cover is provided with a ventilating port.

With the above arrangement, since the cover is provided with a ventilating port, the ventilation in the cover can be conducted to prevent the rising of the temperature of the power transmitting means.

To achieve the above second object, according to a fifth aspect and feature of the present invention, an engine hanger device in an outboard engine system provided with an engine which includes a crankshaft disposed substantially vertically, and a pair of balancer shafts driven by the crankshaft through an endless transmitting band, characterized in that the pair of balancer shafts are supported on laterally opposite sides of a cylinder axis in a cylinder block; a tension pulley for applying a tension to the endless transmitting band disposed along an upper surface of the cylinder block is mounted on one side of the cylinder axis, and an engine hanger for hanging the outboard engine system along with the engine is mounted outside a loop provided by the endless transmitting band and on the other side of the cylinder axis.

With the above arrangement, the pair of balancer shafts are supported on the laterally opposite sides of the cylinder axis in the cylinder block; the tension pulley for applying the tension to the endless transmitting band disposed along the upper surface of the cylinder block is mounted on one side of the cylinder axis, and the engine hanger for hanging the outboard engine system along with the engine is mounted outside the loop provided by the endless transmitting band and on the other side of the cylinder axis. Therefore, the balancer shafts, the endless transmitting band, the tension pulley and the engine hanger can be disposed reasonably in the upper surface of the cylinder block, so that they do not interfere with one another, thereby providing a reduction in size of the cylinder block.

To achieve the above second object, according to a sixth aspect and feature of the present invention, in addition to the fifth feature, there is provided an engine hanger device in an outboard engine system characterized in that the tension pulley for applying the tension to the endless transmitting band for driving a cam shaft by the crankshaft and the tension pulley for applying the tension to the endless transmitting band for driving the balancer shafts are disposed in such a manner that at least portions thereof are vertically overlapped with each other.

With the above arrangement, the tension pulley for applying the tension to the endless transmitting band for driving the cam shaft by the crankshaft and the tension pulley for applying the tension to the endless transmitting band for driving the balancer shafts are disposed in such a manner that at least portions thereof are vertically overlapped with each other and therefore, the space in the upper surface of the cylinder block can be effectively utilized, thereby further reducing the size of the cylinder block.

BRIEF DESCRIPTION THE DRAWINGS

FIGS. 1 to 7 show an embodiment of the present invention.

BEST MODE FOR CARRYING OUT THE INVENTION

A mode for carrying out the present invention will now be described by way of an embodiment shown in FIGS. 1 to 7.

Figure 1:
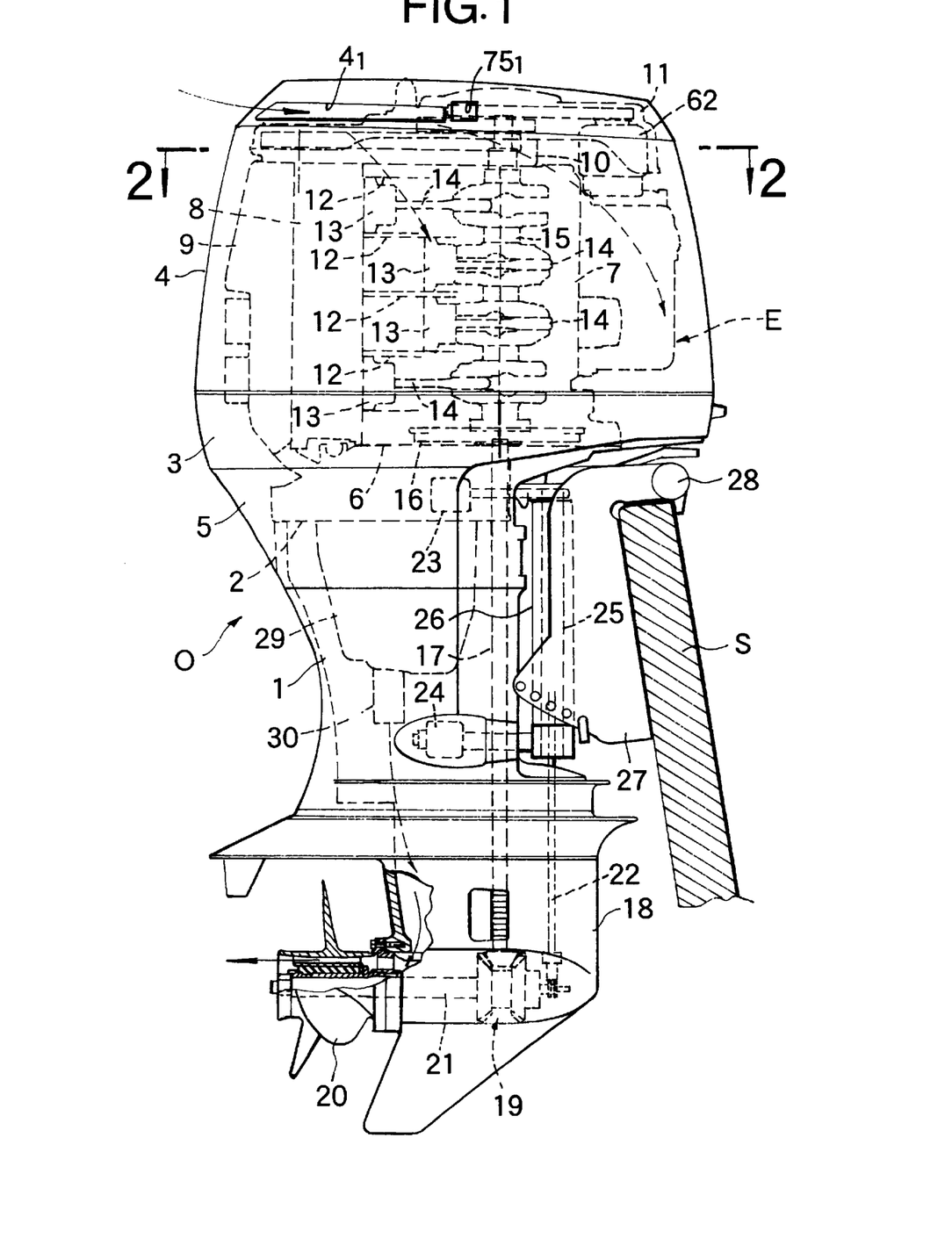
FIG. 1 is a side view of the entire arrangement of an outboard engine system.

As shown in FIG. 1, an outboard engine system O includes a mount case 2 coupled to an upper portion of an extension case 1. A water-cooled serial 4-cylinder and 4-cycle engine E is supported on an upper surface of the mount case 2 with a crankshaft 15 disposed vertically. An under-case 3 having an upper surface opened is coupled to the mount case 2, and an engine cover 4 is detachably mounted on an upper portion of the under-case 3. An under-cover 5 is mounted between a lower edge of the under-case 3 and an edge of the extension case 1 near its upper end so as to cover an outside of the mount case 2.

The engine E includes a cylinder block 6, a crankcase 7, a cylinder head 8, a head cover 9, a lower belt cover 10 and an upper belt cover 11. Lower surfaces of the cylinder block 6 and the crankcase 7 are supported on the upper surface of the mount case 2. Pistons 13 are slidably received in four cylinders 12 defined in the cylinder block 6 and are connected to the crankshaft 15 disposed vertically, through connecting rods 14.

A driving shaft 17 connected to a lower end of the crankshaft 15 along with a flywheel 16 extends downwards within the extension case 1 and is connected at its lower end to a propeller shaft 21 having a propeller 20 at its rear end, through a bevel gear mechanism 19 provided within a gear case 18. A shift rod 22 is connected at its lower end to a front portion of the bevel gear mechanism 19 to change over the direction of rotation of the propeller shaft 21.

A swivel shaft 25 is fixed between an upper mount 23 provided on the mount case 2 and a lower mount 24 provided on the extension case 1. A swivel case 26 for rotatably supporting the swivel shaft 25 is vertically swingably carried on a stern bracket 27 mounted at a stern S through a tilting shaft 28.

An oil pan 29 and an exhaust pipe 30 are coupled to a lower surface of the mount case 2. An exhaust gas discharged from the exhaust pipe 30 into a space within the extension case 1 is discharged through a space within the gear case 18 and the inside of the a boss portion of the propeller 20 into the water.

Figure 2:
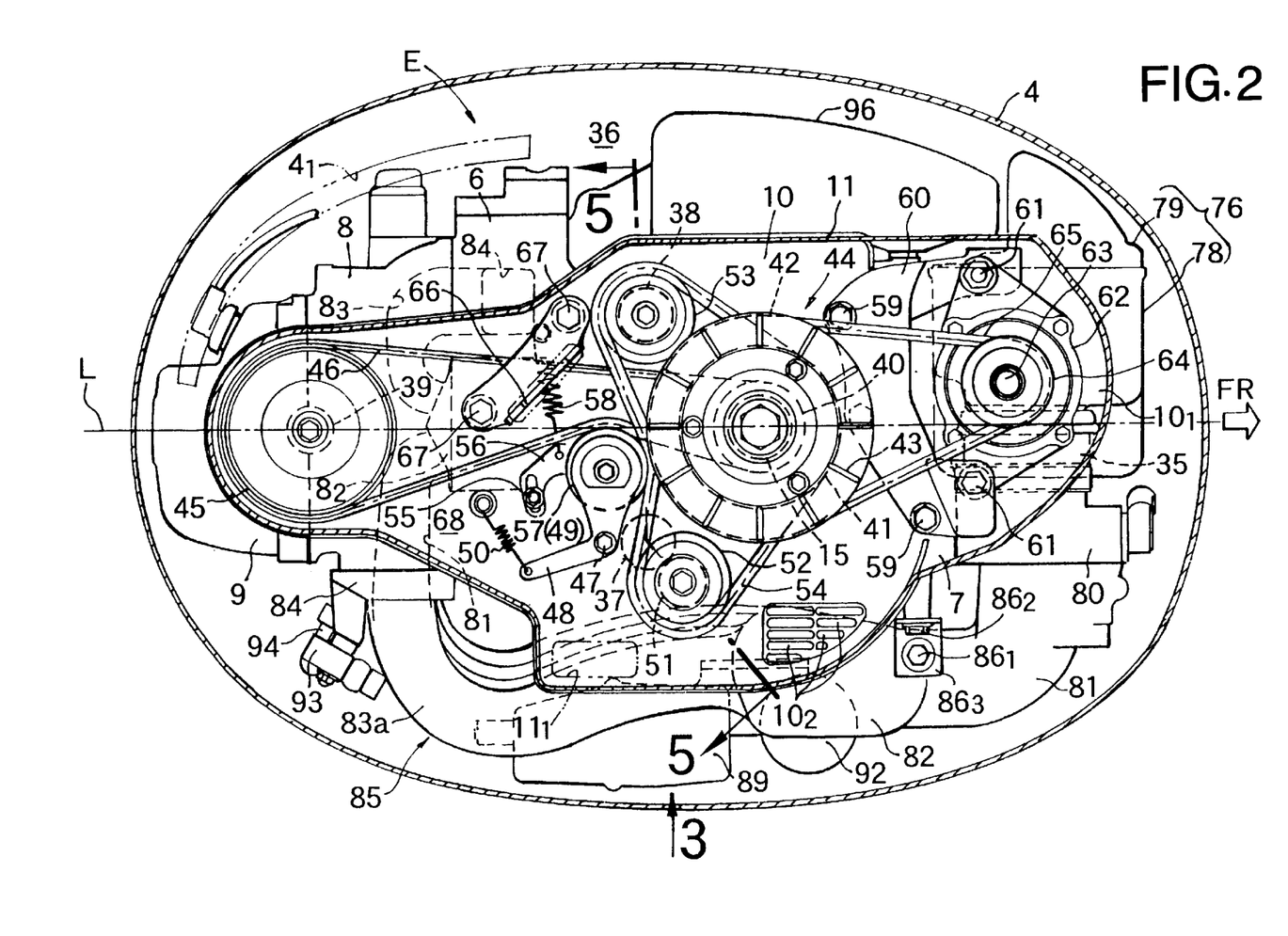
FIG. 2 is an enlarged sectional view taken along a line 2—2 in FIG. 1.

As can be seen from FIG. 2, the engine E accommodated in an engine room 36 defined by the under-case 3 and the engine cover 4 includes two secondary balancer shafts 37 and 38 disposed in parallel to the crankshaft 15, and a single cam shaft 39. The secondary balancer shafts 37 and 38 are supported in the cylinder block 6 at locations nearer the cylinder head 8 than the crankshaft 15, and the cam shaft 39 is supported on mating faces of the cylinder head 8 and the head cover 9.

A pulley assembly 44 is fixed to an upper end of the crankshaft 15 and comprised of a cam shaft drive pulley 40, a secondary balancer shaft drive pulley 41, a generator drive pulley 42 and a cooling fan 43 which are formed integrally with one another. A cam shaft follower pulley 45 fixed to an upper end of the cam shaft 39 and the cam shaft drive pulley 40 are connected to each other by an endless belt 46. The diameter of the cam shaft drive pulley 40 is set at one half of the diameter of the cam shaft follower pulley 45, so that the cam shaft 39 is rotated at a speed which is one half of the speed of the crankshaft 15. A tension pulley 49 mounted at one end of an arm 48 pivotally supported by a pin 47 is urged against an outer surface of the endless belt 46 by the resilient force of a spring 50, thereby providing a predetermined tension to the endless belt 46.

Figure 5:
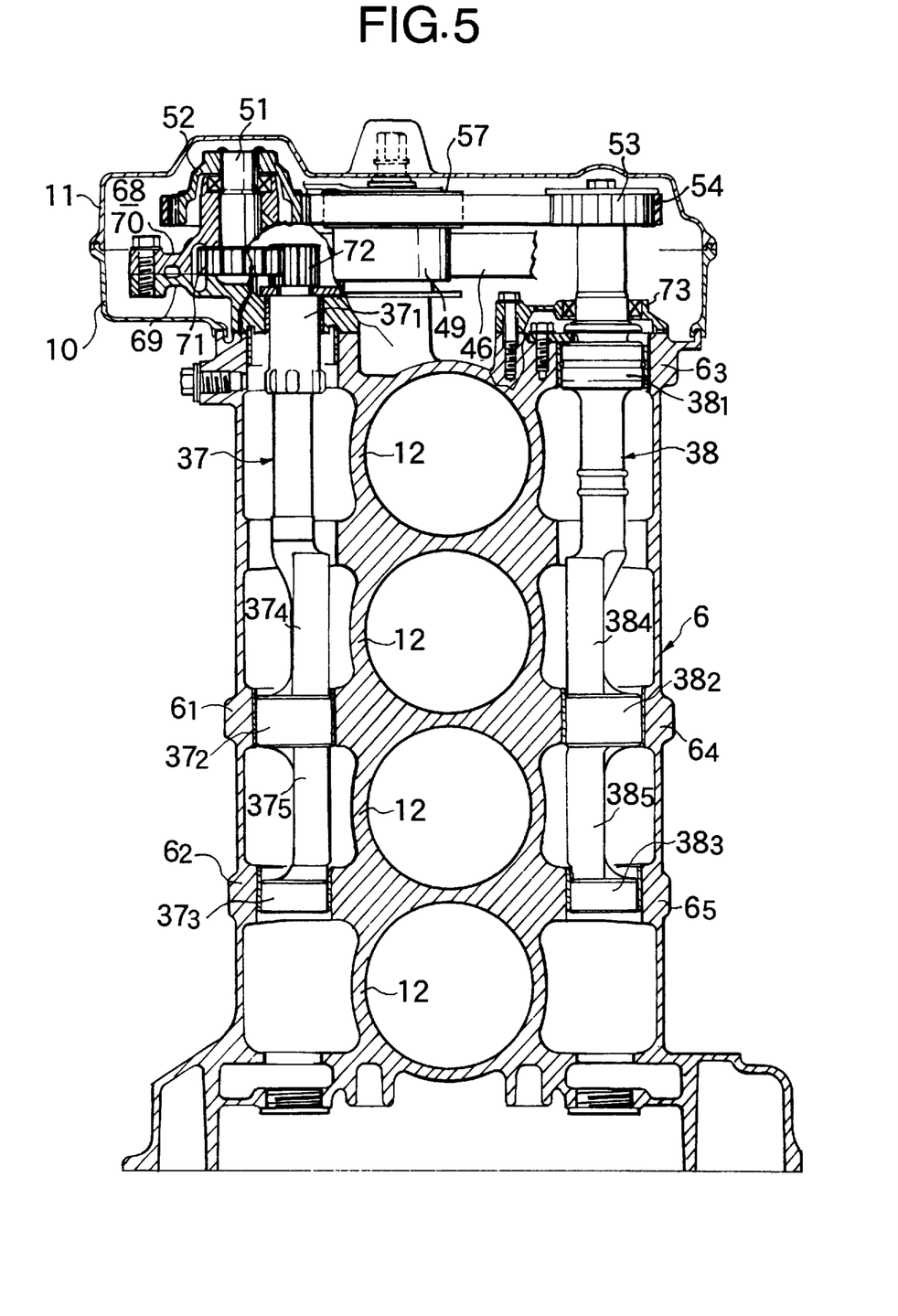
FIG. 5 is a sectional view taken along a line 5—5 in FIG. 2.

As can be seen from FIGS. 2 and 5, the right secondary balancer shaft 37 and the left secondary balancer shaft 38 are vertically disposed so that the four cylinders 12 defined in the cylinder block 6 are interposed therebetween. A balancer shaft supporting member 69 and an intermediate shaft supporting member 70 are coupled to an upper surface of the cylinder block 6. An upper end of the right secondary balancer shaft 37 protrudes upwards from an upper surface of the cylinder block 6 and extends into both the supporting members 69 and 70, and an intermediate shaft 51 is rotatably supported in the intermediate shaft supporting member 70. A secondary balancer shaft follower pulley 52 is fixed to an upper end of the intermediate shaft 51 extended upwards from the intermediate shaft supporting member 70, and an intermediate gear 71 provided on a lower end of the intermediate shaft 51 is meshed with an intermediate gear 72 provided at an upper end of the right secondary balancer shaft 37.

The right secondary balancer shaft 37 includes three journal portions $37_1$, $37_2$ and $37_3$, and two balancer weight portions $37_4$ and $37_5$ which are eccentric from a rotational axis thereof. The upper journal portion $37_1$, is supported in the balancer shaft supporting member 69, and the central and lower two journal portions $37_2$ and $37_3$ are rotatably supported in journal supporting portions $6_1$ and $6_2$ formed in the cylinder block 6.

The left secondary balancer shaft 38 includes three journal portions $38_1$, $38_2$ and $38_3$, and two balancer weight portions $38_4$ and $38_5$ which are eccentric from a rotational axis thereof. The three journal portions $38_1$, $38_2$ and $38_3$ are rotatably supported in three journal supporting portions $6_3$, $6_4$ and $6_5$ formed in the cylinder block 6, respectively. A secondary balancer shaft follower pulley 53 is mounted on that upper surface of the left secondary balancer shaft 38 which protrudes upwards through a cap member 73 mounted on an upper surface of the cylinder block 6, and the secondary balancer shaft drive pulley 41 and a pair of secondary balancer shaft follower pulleys 52 and 53 are connected to each other by an endless belt 54. A tension pulley 57 mounted at one end of an arm 56 pivotally supported by a pin 55 is urged against an outer surface of the endless belt 54 by a resilient force of a spring 58, whereby a predetermined tension is applied to the endless belt 54. Thus, the pair of secondary balancer shafts 37 and 38 are rotated in opposite directions from each other at a speed two times that of the crankshaft 15.

Figure 6:
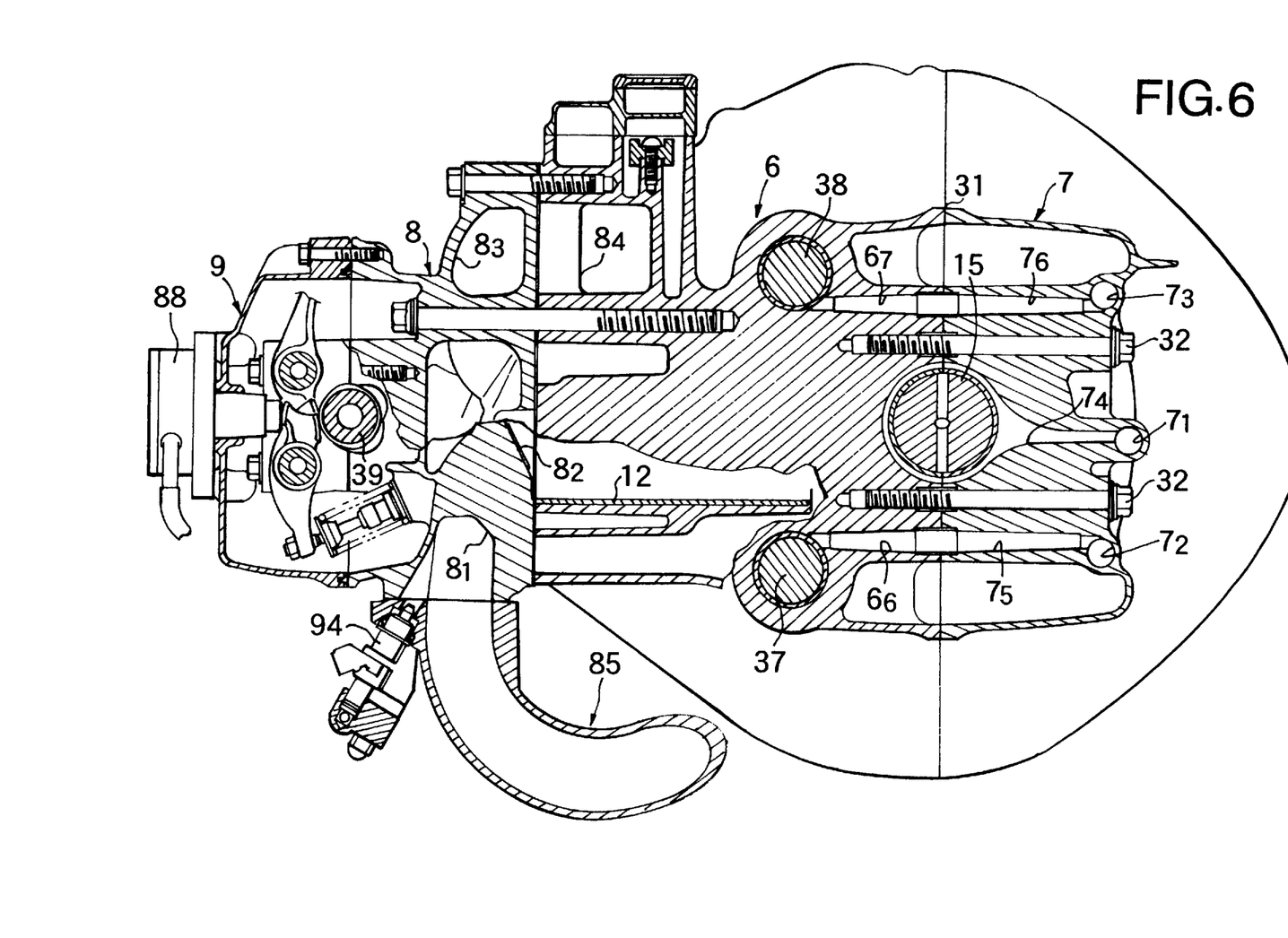
FIG. 6 is a sectional view taken along a line 6—6 in FIG. 3.

As can be seen from FIG. 6, the cylinder block 6 and a crankcase 7 are coupled to each other on dividing surfaces 31 extending through the center of the crankshaft 15 and are integrally fastened to each other by threadedly inserting bolts 32 inserted from the side of the crankcase 7 into the cylinder block 6. Both the secondary balancer shafts 37 and 38 are supported in the cylinder block 6 rather than in the crankcase 7 and hence, there is not a possibility that the bolts 32 for fastening the crankcase 7 to the cylinder block 6 may interfere with both the secondary balancer shafts 37 and 38, thus providing a remarkably increased degree of freedom of the layout of both the secondary balancer shafts 37 and 38.

Three oil passages $7_1$, $7_2$ and $7_3$ are vertically defined in the crankcase 7, so that the crankshaft 15 is lubricated by an oil flowing in an oil passage $7_4$ diverging horizontally from the oil passage $7_1$, and both the secondary balancer shafts 37 and 38 are lubricated by an oil flowing in oil passages $7_5$, $7_6$; $7_6$, $7_7$ diverging horizontally from the oil passages $7_2$ and $7_3$.

Returning to FIG. 2, a generator 62 is supported by two bolts 61, 61 on a bracket 60 which is fixed to the upper surface of the crankcase 7 by two bolts 59, 59. A generator follower pulley 64 fixed to a rotary shaft 63 of the generator 62 and the generator drive pulley 42 are connected to each other by an endless belt 65, and the generator 62 is driven by the crankshaft 15. By providing the generator 62 separately from the engine E in the above manner, the general-purpose generator 62 can be used, which is advantageous for the cost and moreover, the capacity of the generator 62 can easily be increased, as compared with the case where the generator is incorporated into the flywheel mounted on the crankshaft 15.

Three belts 46, 54 and 65 for driving the cam shaft 39, the secondary balancer shafts 37 and 38 and the generator 62 are accommodated in a belt chamber 68 defined by the lower and upper belt covers 10 and 11. The lower belt cover 10 has an opening $10_1$ surrounding the periphery of the generator 62, and a plurality of slits $10_2$ in its bottom wall on the right of the crankshaft 15, so that air is introduced into the belt chamber 68 through the opening $10_1$ and the slits $10_2$.

Figure 3:
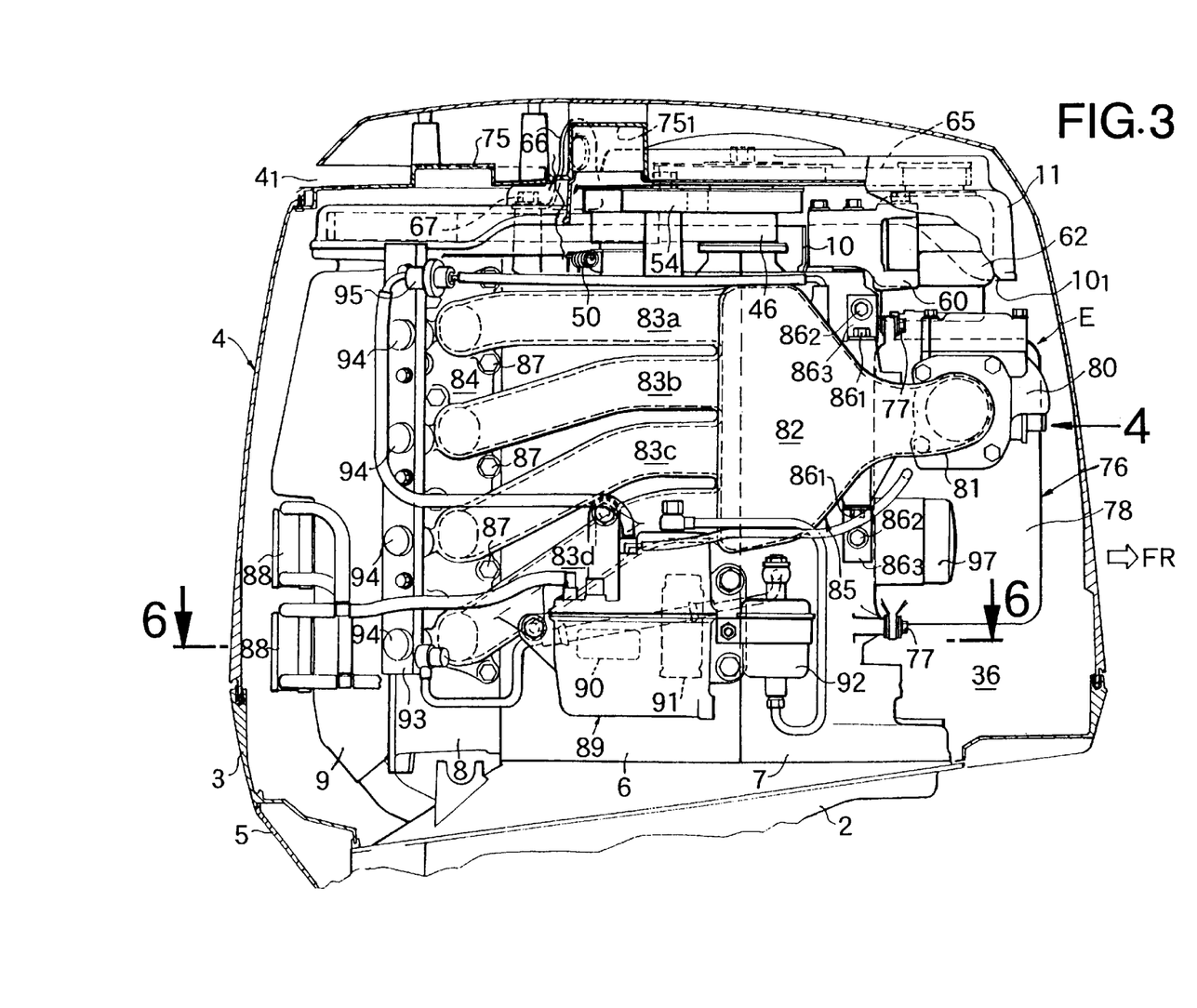
FIG. 3 is a view taken in the direction of an arrow 3 in FIG. 2.
Figure 4:
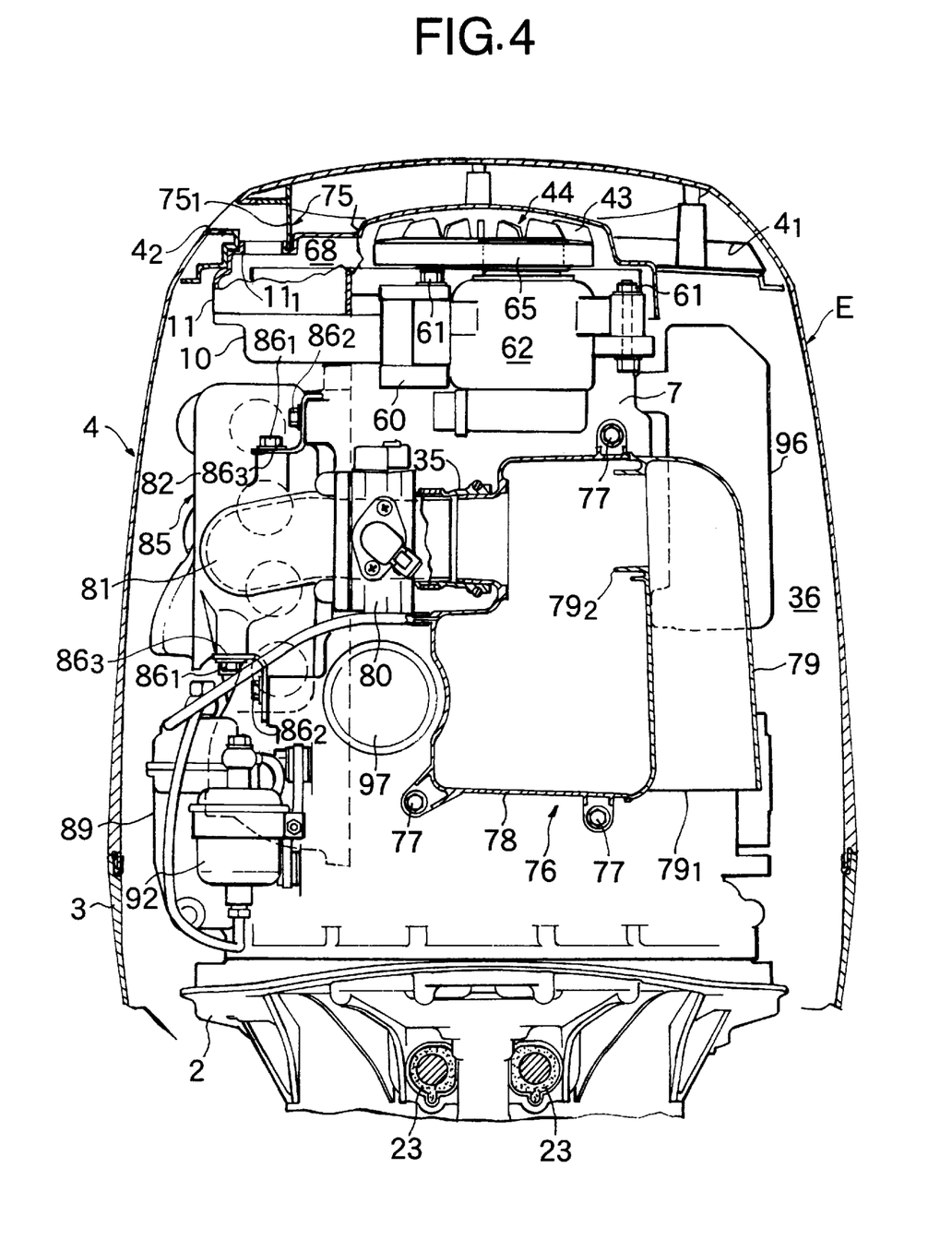
FIG. 4 is a view taken in the direction of an arrow 4 in FIG. 3.

As can be seen from FIGS. 2 to 4, a pair of left and right slit-shaped air intake bores $4_1$, $4_1$ (FIG. 2 shows only the left side) are defined in a rear surface of an upper portion of the engine cover 4, and a guide plate 75 extending forwards from lower edges of the air intake bores $4_1$, $4_1$ is fixed to an inner surface of the engine cover 4. Therefore, air drawn from the air intake bores $4_1$, $4_1$ flows forwards through a space defined between an upper wall of the engine cover 4 and the guide plate 75 to enter the engine room 36 from a front edge of the guide plate 75. A ventilating duct $75_1$ (see FIG. 4) is formed in a right side of the guide plate 75, so that its lower end communicates with an opening $11_1$ defined in a right side of the upper belt cover 11 and its upper end communicates with an opening $4_2$ defined in a right side of the upper portion of the engine cover 4. The ventilating duct $75_1$ permits the belt chamber 68 surrounded by the lower and upper belt covers 10 and 11 to be put into communication with the open air, thereby performing the ventilation.

The upper ends of the secondary balancer shafts 37 and 38 and the upper end of the crankshaft 15 protrude from the upper surface of the cylinder block 6 into the belt chamber 68 surrounded by the belt covers 10 and 11, and are connected to each other in the belt chamber 68 by a power transmitting means comprising the endless belt 54. Therefore, the power transmitting means can be protected from dusts or sea water, and further, the maintenance of the power transmitting means is facilitated, as compared with the case where the power transmitting means is accommodated within the cylinder block 6. Moreover, the belt chamber 68 is ventilated by the outside air incoming through the ventilation port $75_1$ and hence, it is possible to effectively cool the power transmitting means to prevent the rising of the temperature thereof.

As can be seen from FIG. 2, the tension pulley 57 abutting against the endless belt 54 reeved between the pair of secondary balancer shaft follower pulleys 52 and 53 and the tension pulley 49 for the endless belt 46 for the driving the cam shaft 39 are disposed in substantially vertically superposed relation to each other at a location offset rightwards with respect to the axes L of the cylinders 12 provided in the cylinder block 6. An engine hanger 66 used to hang the outboard engine system 0 are fixed by two bolts 67, 67 at a location offset leftwards with respect to the axes L. The engine hanger 66 is disposed outside a loop of the endless belt 54 for driving the secondary balancer shafts 37 and 38 to straddle over the endless belt 46 of the cam shaft 39.

Even if there is not a margin in a space in the upper surface of the cylinder block 6 due to the disposition of the endless belt 54 for driving the secondary balancer shafts 37 and 38 on the upper surface of the cylinder block 6 in the above manner, the small space can be effectively utilized to provide a reduction in size of the cylinder block 6 by disposing the tension pulleys 49 and 57 and the engine hanger 66 in such a manner that they are distributed on the left and right sides of the axes L of the cylinders 12. In addition, the effective utilization of the space can be achieved, even by disposing the tension pulley 57 for the endless belt 54 for driving the secondary balancer shafts 37 and 38 and the tension pulley 49 for the endless belt 46 for driving the cam shaft 39 in the substantially vertically superposed relation to each other.

Figure 7:
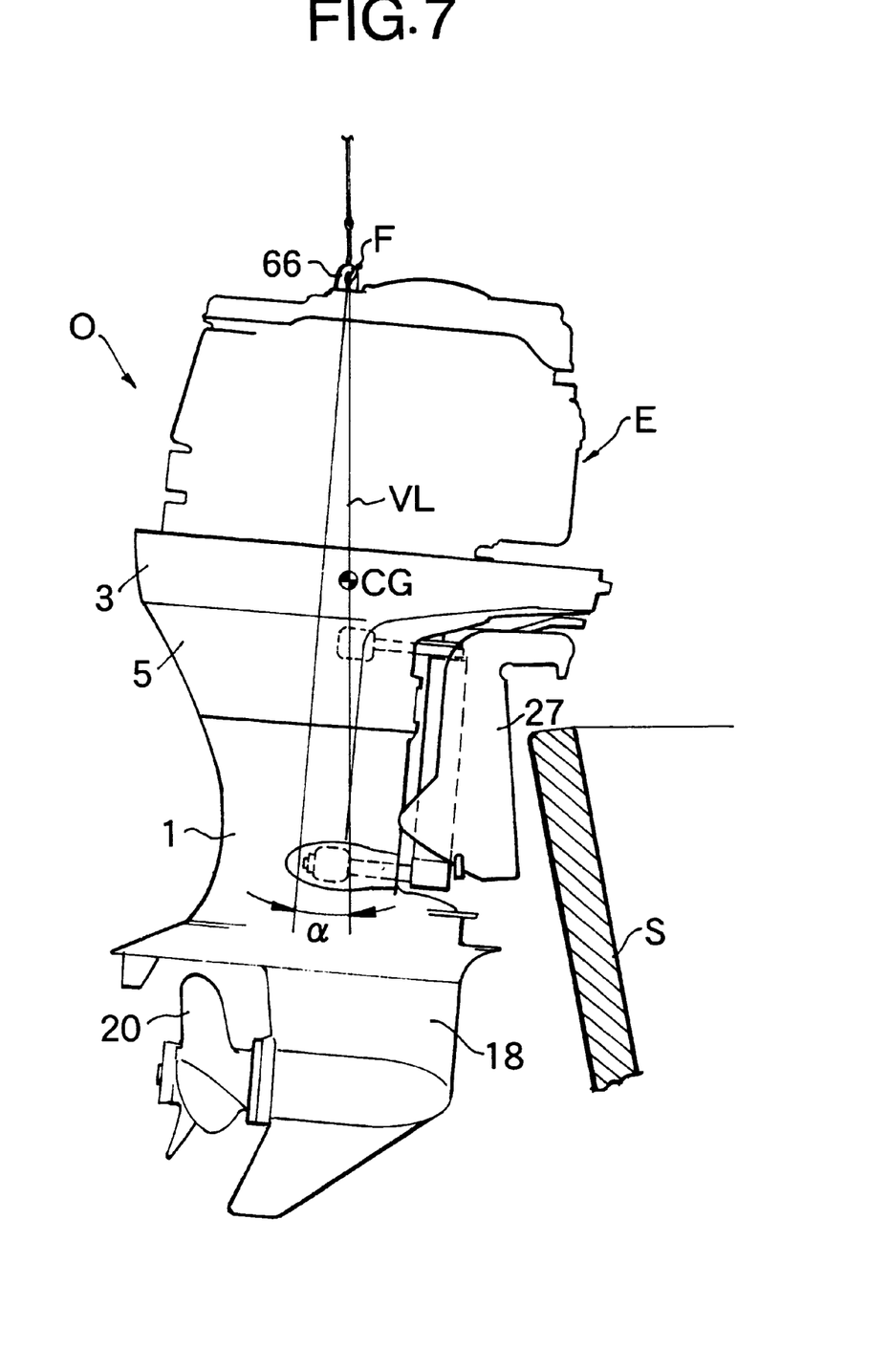
FIG. 7 is a view for explaining the operation.

If the engine cover 4 is removed, the engine hanger 66 is exposed to the upper surface of the upper belt cover 11 and hence, a hook F of a chain block or a crane can be brought into engagement with the engine hanger 66 to hoist the outboard engine system O, as shown in FIG. 7. At this time, the position of the engine hanger 66 is slightly at the rear of the position CG of the gravity center of the outboard engine system O. For this reason, the hoisted outboard engine system 0 is inclined forwards at a predetermined angle α (e.g., about 5°) with respect to a vertical line VL and thus, it is possible to easily carry out the operation of fixing the stern bracket 27 to the stern S, or the operation of removing the stern bracket 27 from the stern S.

The structures of the intake system and the fuel supply system in the engine E will now be described with reference to FIGS. 2 to 4.

An intake silencer 76 is fixed to a front surface of the crankcase 7 by three bolts 77. The intake silencer 76 comprises a box-shaped body portion 78, and a duct portion 79 coupled to a left side of the body portion 78. The duct portion 79 has an intake opening $79_1$, provided downwards in its lower end, and a communication bore $79_2$ provided in its upper end to communicate with an internal space in the body portion 78. A throttle body 80 is disposed in a right side of the body portion 78 of the intake silencer 76 and connected to the body portion 78 through a short intake duct 35 having flexibility.

The throttle body 80 is connected and fixed to an intake manifold 85 which will be described below. The intake manifold 85 is disposed to extend along a right side of the engine E and is integrally provided with an elbow 81, a surge tank 82, four intake pipes 83a, 83b, 83c and 83d and a mounting flange 84. The elbow 81 serves to change the flow of intake air by approximately 90° from the flow along the front surface of the crankcase 7 to the flow along a right side of the crankcase 7. The elbow 81 may be a duct having flexibility, but is integral with the surge tank 82, the intake pipes 83a, 83b, 83c and 83d and the mounting flange 84 in order to support and fix the throttle body 80 in this embodiment.

A connecting portion between the elbow 81 and the surge tank 82 of the intake manifold 85 has a size vertically smaller than upper and lower ends of the surge tank 82. The intake manifold 85 is fixed at this portion to a right sidewall of the crankcase 7 by bolts $86_1$, $86_1$; $86_2$, $86_2$ and two brackets $86_3$, $86_3$ having loose bores. Further, the mounting flange 84 is fixed to a right side of the cylinder head 8 by a plurality of bolts 87.

Two low-pressure fuel pumps 88, 88 are mounted in parallel on the rear surface of the head cover 9, so that fuel is supplied from a fuel tank (not shown) mounted within a boat to a subsidiary tank 89 mounted on a right side of the cylinder block 6 by the low-pressure fuel pumps 88, 88. A float valve 90 for regulating the level of the fuel and a high-pressure fuel pump 91 are accommodated within the subsidiary tank 89, and the fuel pressurized by the high-pressure fuel pump 91 is supplied via a high-pressure filter 92 to a lower end of a fuel rail 93. Four fuel injection valves 94 are provided in a mounting flange 84 of an intake manifold 85 corresponding to the four cylinders 12, and the fuel is supplied from the fuel rail 93 to the fuel injection valves 94. A regulator 95 provided at an upper end of the fuel rail 93 regulates the pressure of the fuel supplied to the fuel injection valves 94, and circulates a surplus amount of the fuel to the subsidiary tank 89.

As can be seen from FIG. 2, air flow within the intake manifold 85 is mixed with the fuel injected from the fuel injection valves 94. The mixture is supplied through an intake port $8_1$ defined in the cylinder head 8 into a combustion chamber $8_2$, and an exhaust gas is discharged from an exhaust port $8_3$ via an exhaust passage $8_4$ into the exhaust pipe 30 (see FIG. 1). The exhaust passage $8_4$ is defined vertically in that left side of the cylinder block 6 which is opposite from the intake manifold 85 disposed on the right side of the cylinder block 6.

Further, an electric equipment box 96 and a cartridge-type oil filter 97 are disposed within the engine room 36. The electric equipment box 96 is disposed along the left sides of the cylinder block 6 and the crankcase 7 and formed so that its lateral dimension is smaller than its longitudinal and vertical dimensions. The electric equipment box 96 is accommodated compact in a narrow space between both of the cylinder block 6 and the crankcase 7 and the inner surface of the engine cover 4. The cartridge-type oil filter 97 mounted on the front surface of the crankcase 7 is disposed below the generator 62 as viewed in the axial direction of the crankshaft 15, so that it is distributed laterally on opposite sides of the crankshaft 15. Thus, the front space of the engine room 36 is effectively utilized.

Although the embodiment of the present invention has been described in detail, it will be understood that the present invention is not limited to the above-described embodiment, and various modifications in design may be made without departing from the spirit and scope of the invention defined in claims.

For example, the engine E for the outboard engine system O has been illustrated in the embodiment, but embodiments according to claims 1 to 4 of the present invention can be applied to an engine for a system other than the outboard engine system. In the embodiment, the tension pulley 57 is disposed on the right of the cylinder axis L and the engine hanger 66 is disposed on the left of the cylinder axis L, but according to claims 5 and 6 of the present invention, the positional relationship between the tension pulley 57 and the engine hanger 66 may be reversed. Additionally, in the embodiment, the tension pulley 49 for applying the tension to the endless belt 46 for driving the cam shaft 39 is disposed below the tension pulley 57, and the tension pulley 57 for applying the tension to the endless belt 54 for driving both the secondary balancer shafts 37 and 38 is disposed above the tension pulley 49. However, according to claims 5 and 6 of the present invention, the positional relationships between the endless belts 46 and 54 and the tension pulleys 49 and 57 may be reversed.

What is claimed is:

1. A balancer shaft supporting structure in an engine including a crankshaft (15) disposed substantially vertically and clamped between dividing surfaces (31) of cylinder block (6) and a crankcase (7), said crankcase (7) being fastened to said cylinder block (6) by bolts (32) inserted from the side of said crankcase (7), structure including balancer shafts (37, 38) connected to and driven by said crankshaft (15), said balancer shafts (37, 38) being supported substantially vertically in said cylinder block (6), wherein upper ends of said balancer shafts (37, 38) and an upper end of said crankshaft (15) protrude upwards from an upper surface of said cylinder block (6), the protrusions of said balancer shafts (37, 38) and said crankshaft (15) being connected together by a power transmitting means (54) and said power transmitting means (54) is covered with a cover (10, 11).

2. A balancer shaft supporting structure in an engine according to claim 1, wherein said cover is provided with a ventilating port ($75_1$).

3. An engine hanger device in an outboard engine system provided with an engine (E) which includes a crankshaft (15) disposed substantially vertically, and a pair of balancer shafts (37 and 38) driven by said crankshaft (15) through an endless transmitting band (54), wherein said pair of balancer shafts (37, 38) are supported on laterally opposite sides of a cylinder axis (L) in a cylinder block (6); a tension pulley (57) for applying a tension to said endless transmitting band (54) disposed along an upper surface of said cylinder block (6) is mounted on one side of said cylinder axis (L), and an engine hanger (66) for hanging the outboard engine system (O) along with the engine (E) is mounted outside a loop provided by said endless transmitting band (54) and on the other side of said cylinder axis (L).

4. An engine hanger device in an outboard engine system according to claim 3, wherein a tension pulley (49) for applying a tension to an endless transmitting band (46) for driving a cam shaft (39) by said crankshaft (15) and said tension pulley (57) for applying the tension to said endless transmitting band (54) for driving said balancer shafts (37, 38) are disposed in such a manner that at least portions thereof are vertically overlapped with each other.

5. An outboard engine system comprising a bracket (27) for mounting to a stern (S) through a tilting shaft (28), said tilting shaft (28) being disposed on a front side of said engine system (O), a crankshaft (15) disposes substantially vertically, balancer shafts (37, 38) connected to and driven by said crankshaft (15), and a generator (62), said balancer shafts (37, 38) being disposed substantially vertically and located rearwardly of said crankshaft (15), wherein said generator (62) has an axis (63) separate from said crankshaft (15) and is located forwardly of said crankshaft (15).

6. An outboard engine system according to claim 5, wherein said balancer shafts (37, 38) are driven at upper ends thereof by said crankshaft (15) and an engine hanger (66) for hanging of the outboard engine system (O) is provided on an upper side of said engine system at a position rearwardly of an area in which said balancer shafts (37, 38) are driven by said crankshaft (15), and wherein in a hung position at said engine hanger (66), said outboard engine system (O) is inclined forwardly at an upper portion thereof.

* * * * *